United States Patent
Sugaya et al.

(10) Patent No.: US 6,483,636 B1
(45) Date of Patent: Nov. 19, 2002

(54) OPTICAL AMPLIFIER

(75) Inventors: Yasushi Sugaya; Hiroaki Tomofuji; Rikiya Watanabe, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/690,834

(22) Filed: Oct. 18, 2000

(30) Foreign Application Priority Data

Oct. 18, 1999 (JP) ............................................ 11-295661

(51) Int. Cl.$^7$ ................................................. H01S 3/00
(52) U.S. Cl. .................................... 359/349; 359/337.2
(58) Field of Search ................................. 359/349, 333, 359/337.2, 341.41

(56) References Cited

U.S. PATENT DOCUMENTS

| | | | | |
|---|---|---|---|---|
| 6,038,063 A | * | 3/2000 | Tsuda et al. ............... | 359/341 |
| 6,049,418 A | * | 4/2000 | Srivastava et al. .......... | 359/341 |
| 6,104,527 A | * | 8/2000 | Yang .......................... | 359/341 |

FOREIGN PATENT DOCUMENTS

| | | |
|---|---|---|
| JP | 9-321701 | 12/1997 |
| JP | 10-229238 | 8/1998 |

OTHER PUBLICATIONS

Sun, Yan et al., "An 80 nm Ultra Wide Band EDFA with Low Noise Figure and High Output Power", 11$^{th}$ International Conference on Integrated Optics and Optical Fibre Communications, ECOC 1997, pp. 69–72.

San, Yan et al., "Ultra Wide Band Erbium–Doped Silica Fiber Amplifier with 80 nm of Bandwidth", OSA Trends In Optics and Photonics Series, vol. 16, pp. 144–147.

Sun, Y., et al., "A Gain–Flattened Ultra Wide Band EDFA For High Capacity WDM Optical Communications Systems", ECOC 1998, pp. 53–54.

Sun, Y., et al., "Optical Fiber Amplifiers for WDM Optical Networks", Bell Labs Technical Journal, Jan.–Mar. 1999, vol. 4, No. 1, pp. 187–206.

* cited by examiner

*Primary Examiner*—Mark Hellner
(74) *Attorney, Agent, or Firm*—Staas & Halsey LLP (57) ABSTRACT

An optical amplifier to reduce signal loss by reducing crosstalk, and method therefor. A demultiplexer isolates an optical signal into a first wavelength band and a second wavelength band. The first and second wavelength bands are separately amplified in first and second optical amplifiers, respectfully, first and second optical amplifies each including cutoff filters to cutoff the wavelength band not corresponding to the particular amplifier. Optical receiving elements monitor light input to the first and second optical amplifiers and receive crosstalk signals on an output side.

23 Claims, 7 Drawing Sheets

FIG. 6 monitor line of wavelength characteristic of cutoff filter 845 monitor line of wavelength characteristic of cutoff filter 745

FIG. 7

OPTICAL AMPLIFIER

CROSS-REFERENCE TO RELATED APPLICATIONS

This application claims the benefit of Japanese Application No. 11-295661, filed Oct. 18, 1999, in the Japanese Patent Office, the content of which is incorporated herein by reference.

BACKGROUND OF THE INVENTION

Field of the Invention

The present invention relates to an optical amplifier that reduces signal loss by reducing crosstalk.

With the rapid development of multimedia networks, demand for information is increasing remarkably and therefore there is a need for further improvement in capacity and network flexibility. These needs may be addressed by improving the main optical transmission system for concentrating information capacity.

The wavelength division multiplexing (WDM) system is currently the most effective system for meeting the above-described demand and it is now intended for commercial use mainly in North America. In the WDM transmission system, an optical fiber amplifier is an essential device.

The present invention is applied to a structure of an optical amplifier to amplify a plurality of multiplexed bands. More specifically, the present invention allows the band of an optical amplifier to be widened.

2. Description of the Related Art As a method of widening the bandwidth of a repeater utilizing an optical fiber amplifier, there is provided a structure in which a plurality of bands are respectively amplified with exclusive optical amplifiers. An optical multiplexer and an optical demultiplexer are respectively provided at the input and output ends for parallel amplification.

Figure 1:
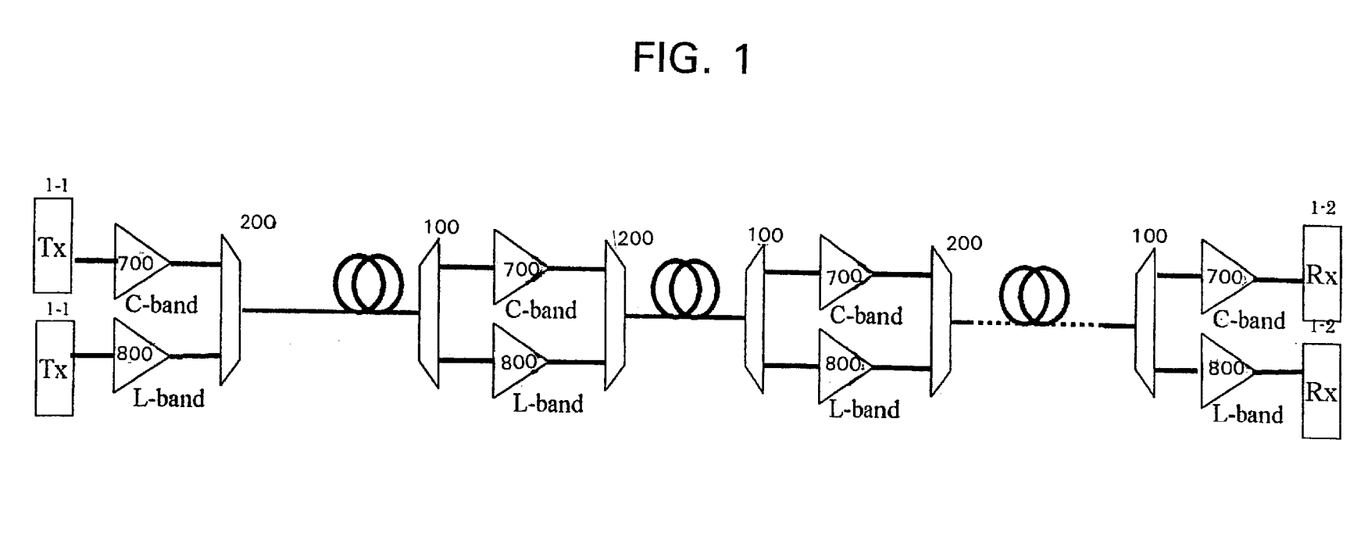
FIG. 1 a block diagram of a multiple band transmission system with a parallel amplifying structure.

Referring to FIG. 1, which is a block diagram of a multiple-band-transmission system with a parallel amplifying structure, including a transmitting part 1-1 and a receiving part 1-2, a demultiplex coupler 100 demultiplexes the C-band (1.53 to 1.56 μm) and the L-band (1.57 to 1.60 μm). A multiplex coupler 200 multiplexes the C-band and L-band. An optical amplifier 700 amplifies the C-band and an optical amplifier 800 amplifies the L-band.

The optical amplifying repeater of FIG. 1 has a multiple bandwidth parallel amplifying structure such that crosstalk exists in the demultiplex coupler 100 and the multiplex coupler 200. Namely, in demultiplex coupler 100, the C-band output is in the range of 1.53 to 1.56 μm. Ideally, this output is at the port on the C-band side of optical amplifier 700, but when isolation for rejecting the L-band is set to a higher value, the insertion loss of demultiplex coupler 100 tends to become large and therefore loss of the signal transmitted (main signal light) becomes large, resulting in deterioration of an SN (signal to noise) ratio of the communication system as a whole.

Conversely, when isolation of the demultiplex coupler 100 is set to a relatively low value in order to maintain lower loss for the main signal, a problem arises in that the light of the L-band (1.57 to 1.60 μm) is output as the crosstalk light (leakage light), also at the port of the optical amplifier 700 side of the demultiplex coupler 100 which naturally has to output only 1.53 to 1.56 μm of the C-band. Similarly, a certain amount of C-band leakage light is also incident to the port on the optical amplifier 800 side on the L-band side of demultiplex coupler 100.

If crosstalk light occurs, it will result in detection level error in an optical input monitor located within optical amplifier 700 on the C-band side and optical amplifier 800 on the L-band side. In particular, when the optical amplifiers 700,800 are controlled based on such a detection level (gain constant control or AGC control) and input off monitor (shut-down detection control) control error occurs because an L-band optical light leaks toward the C-band side and a C-band light leaks toward the L-band side.

For example, we will discuss the case of AGC control as applied to optical amplifier 700, noting that the AGC control is performed in a similar manner at optical amplifier 800. The optical power level of the exciting light source of optical amplifier 700 is controlled so that the gain becomes constant by detecting an input to output ratio. The input light monitor of optical amplifier 700 detects an input level in which a crosstalk light is added to the optical power of the wavelength band of the main element and the monitor of an output light of optical amplifier 700 can neglect the crosstalk light because optical amplifier 700 does not amplify the light outside the amplifying bandwidth.

Therefore, since the influence of the crosstalk light on the input monitor and output monitor is different, correct detection of gain, namely, AGC control, is not conducted for a light within the amplifying wavelength band of the optical amplifier 700.

Moreover, when a shut-down detection is to be performed to prevent surge at the time of recovery by monitoring the input light and stopping pumping of optical amplifier 700 or fixing pumping to a particular value if there is no optical input, it may occur that the shut-down condition of the light cannot be detected due to the influence of the crosstalk light despite the fact that the light in the band of the optical amplifier 700 is shut-down. Moreover, such crosstalk may also occur in multiplex coupler 200.

In the case when the output of optical amplifier 700 and the connectors of the transmission lines are disconnected, to assure operator safety, it is required that such a condition be automatically detected in order to stop or decrease the output of optical amplifiers 700,800.

In general, the output of optical amplifier 700 is stopped or decreased by obtaining an amount of reflection with detection of the levels of the reflected light and output of light at the output of each optical amplifier 700,800 in order to determine a difference in reflection amount when the connectors are connected or when they are disconnected.

When the connectors are disconnected, the light, which is subjected to Fresnel reflection (−14 dB) at the connector, and loss equal to two times the loss of the multiplex coupler 200, is returned to optical amplifiers 700,800. Assuming the maximum multiplex filter loss, the connector opening detection threshold value is set to a value less than the amount of reflection.

Meanwhile, when the connectors are connected, considering two times the loss of multiplex coupler 200 as the amount of reflection (determined by reflection attenuation of the connector and Rayleigh scattering in the transmission line), the maximum amount of reflection is assumed and the threshold value of the connector connecting condition is set higher than the maximum reflection amount.

When isolation of optical multiplex coupler 200 is set to a relatively low value, the light of the other bands return to optical amplifiers 700,800 as the crosstalk light (leakage light). Therefore, a problem arises in that the amount of reflection when the connectors are connected increases, a difference of setting values of threshold values when the connectors are opened and connected becomes relatively small, and it becomes difficult to set the threshold value and thereby normal operation is lost.

SUMMARY OF THE INVENTION

In the present invention, in order to overcome the crosstalk of the filter for dividing the band and for amplifying the light in the multiple wavelength bandwidths during optical communication, the optical monitor for each band of the optical amplifier is given the characteristic of rejecting the crosstalk light.

Thereby, rejection of the crosstalk light can be realized without increasing the loss of the main signal and accordingly the structure of the optical amplifier/repeater, which maintains the controllability of the optical amplifier without determining the signal characteristics, is realized.

Additional objects and advantages of the invention will be set forth in part in the description which follows

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 2:
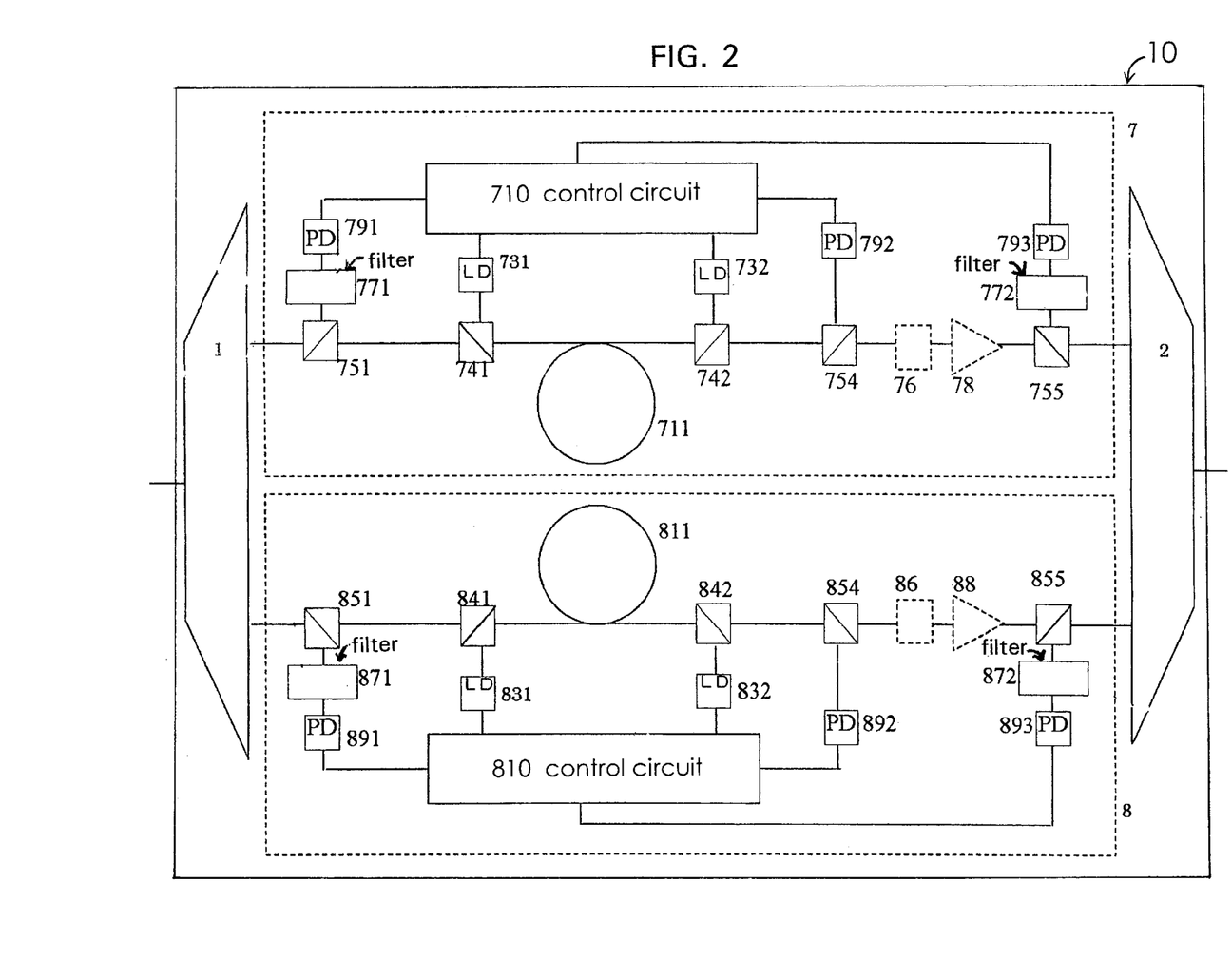
FIG. 2 is a block diagram of a multiple band optical amplifier according to a first embodiment of the present invention.

FIG. 2 illustrates a multiple-band optical amplifier 10 according to a first embodiment of the present invention.

In FIG. 2, band demultiplex coupler 1 demultiplexes C-band and L-band and band multiplex coupler 2 multiplexes C-band and L-band. First C-band optical amplifier 7 and first L-band optical amplifier 8 amplify C-band and L-band, respectively. L-band rejection filters 771,772 and C-band rejection filters 871,872 filter C-band and L-band, respectively. Optical receiving elements 791, 891, 792, 892, 793 and 893 monitor the optical powers, respectively.

An optically multiplexed signal from a transmission line (not shown) is input to band demultiplex coupler 1 and is demultiplexed to the 1.53 to 1.56 μm band of C-band and the 1.57 to 1.60 μm band of L-band and are respectively input to first C-band optical amplifier 7 and first L-band optical amplifier 8.

In this case, in order to reduce loss of the main signal element, a bandwidth demultiplex coupler 1 having a relatively low isolation and large crosstalk between the bands is used.

The optical branching coupler 751 within first C-band optical amplifier 7 branches a predetermined amount of C-band output of the bandwidth demultiplex coupler 1. The branched output is filtered with L-band rejecting filter 771 for the purpose of rejecting the wavelength element other than the C-band. Optical receiving element 791 (which may be a photodiode) monitors the C-band filtered light by detecting optical power of the C-band with rejection filter 771 and then inputs this optical power to control circuit 710.

The control circuit 710 is operated by AGC (auto gain controlling) receives a light power from optical receiving element 792(which may be a photodiode) that is amplified by Erbium-doped fiber (EDF) of C-band and output lights of lasers 731,732; outputs of the lasers 731, 732 are adjusted to obtain a constant value of the ratio of optical receiving elements 791,792 and a pumping light is pumped for the EDF 711 for C-band with the WDM (wavelength division multiplex) couplers 741, 742.

In the present invention, even in the case of AGC control, since the crosstalk light does not enter the monitor of the optical amplifier 7 on the input side, correct AGC control is conducted for the light in the amplifying wavelength band of first optical amplifier 7.

When shut-down is detected, outputs of lasers 731, 732 are controlled by control circuit 710 on the basis of the output received with the optical receiving element 791.

Optical demultiplex coupler 755 demultiplexes the light reflected from bandwidth multiplex coupler 2 and the light is then filtered with L-band rejection filter 772 and is then input to optical receiving element 793 (which may be a photodiode).

Control circuit 710 detects an amount of reflection light from the transmission line and a repeater (not shown) in the subsequent stage based on the ratio of an output of optical receiving element 793 and output to the band multiplex coupler 2 from optical demultiplex coupler 755 in order to control the optical output of C-band optical amplifier 7. The output to band multiplex coupler 2 from optical demultiplex coupler 755 is known from the value of optical receiving element 792.

With the structure explained above, the crosstalk of the band multiplex coupler 2 is rejected with L-band rejection filter 772. Therefore, even if crosstalk is generated in band multiplex coupler 2, only the light of C-band is incident to optical receiving element 793 without influence of crosstalk.

Second C-band optical amplifier 78 and variable attenuator 76 are optionally provided. An output of the multiple band optical amplifier 10 is controlled to adjust (equalize) the gain for each wavelength under automatic level control (ALC).

Second C-band optical amplifier 78 usually performs the AGC control and the light is input to second C-band optical amplifier 78 in order to always make constant the output of second C-band optical amplifier 78 which is controlled with variable attenuator 76.

The elements corresponding to the first C-band optical amplifier 7 in the first L-band optical amplifier 8 are designated with the same reference numbers except for the first digit and like elements perform like operations. In this embodiment, lasers 731, 732, 831, 832 produce a laser light having a wavelength of 0.98 μm or 1.48 μm. Moreover, operations are possible only with forward pumping of the lasers 731, 831 or alternatively with backward pumping of lasers 732, 832. Control circuits 710, 810 have been explained with respect to AGC control, shut-down detection and backward monitoring. Moreover these control circuits may also be adapted to ALC control using an input monitor value.

Figure 3:
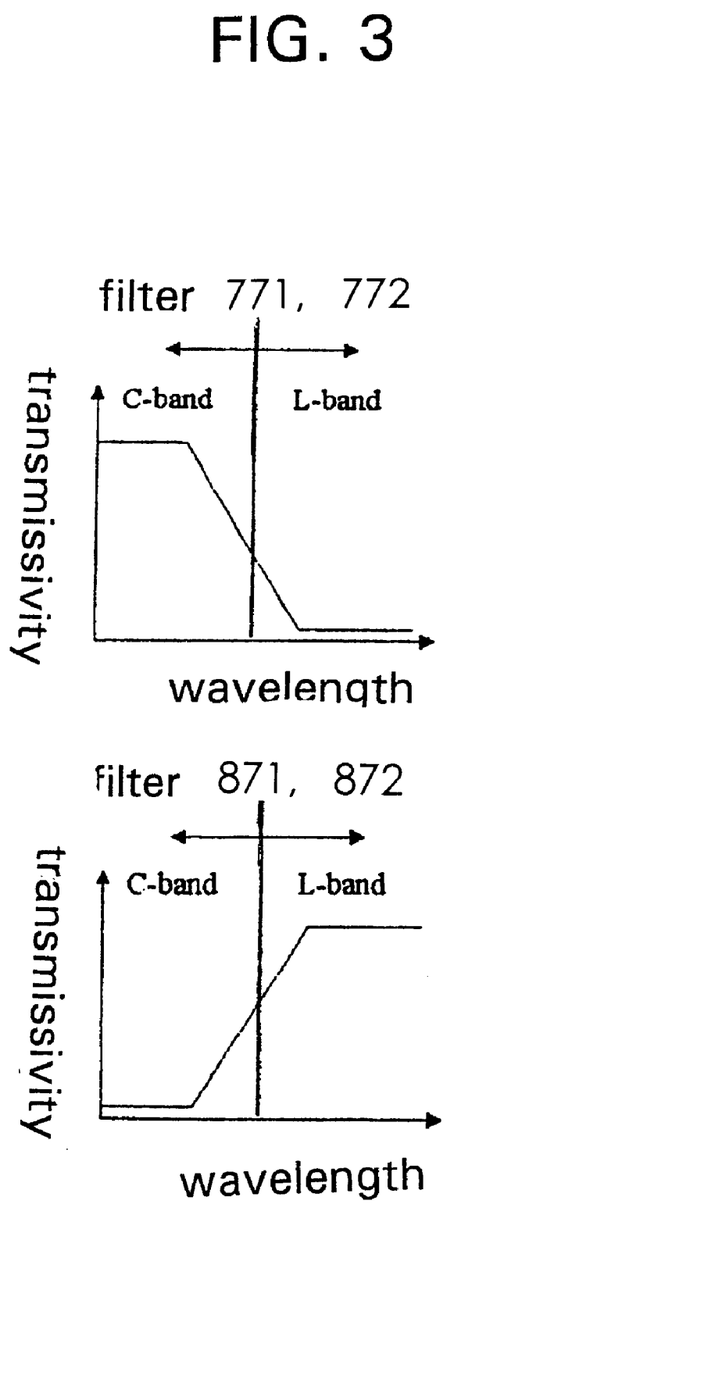
FIG. 3 is a wavelength characteristic of filters 771, 871, 772, 872 of FIG. 2.

In the first embodiment of the present invention, as illustrated in FIG. 3, band rejection filters 771, 871, 772, 872 are capable of transmitting one band and rejecting the other bandwidth. When this rejection characteristic is sufficient, the characteristic specification of crosstalk between bands of the band demultiplex coupler 1 is alleviated to reduce the loss of the main signal. Particularly, when each band is amplified with the optical amplifiers of two stages, if the gain is not corrected accurately in the preceding stage, an output deviation becomes large if gain tilt is generated after the output level becomes high in the subsequent stage. Therefore, it is necessary to accurately monitor the light in the band that is amplified with the optical amplifier.

When one isolation is neglected in the band demultiplex coupler 1, it is enough for the respective band rejection filter to have only one band. For example, if isolation on the C-band side of the band demultiplex coupler 1 is raised, the L-band rejection filter 771 is no longer required and only the C-band rejection filter 871 is required. Moreover, if isolation on the C-band side of bandwidth multiplex coupler 2 is raised, L-band rejection filter 772 is no longer required and only C-band rejection filter 872 is required. However, at the time of amplification, it must be considered that if isolation is increased, loss becomes high.

FIG. 2 illustrates a structure which is applied to an inline amplifier. When this structure is used in a post-amplifier, band demultiplex coupler 1, and rejection filters 771, 871 are omitted. When the structure is used as a pre-amplifier, the band multiplex coupler 2 and rejection filters 772, 872 are not used. This is also true of the second and fourth embodiments.

Figure 4:
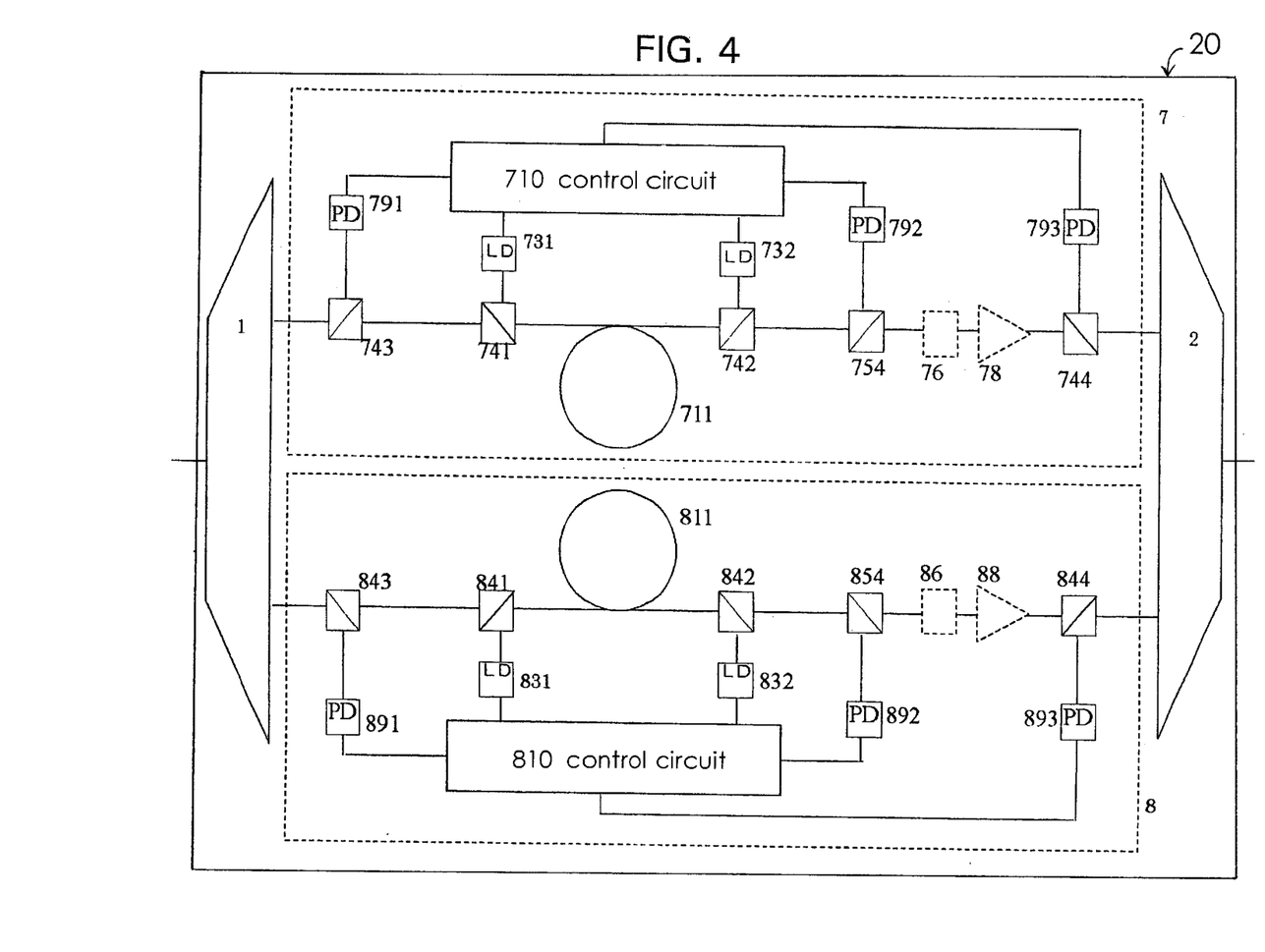
FIG. 4 is a block diagram of a multiple band optical amplifier according to a second embodiment of the present invention.

FIG. 4 illustrates a multiple band optical amplifier 20 according to a second embodiment of the present invention. Multiple band optical amplifier 20 differs from multiple band optical amplifier 10 of FIG. 2 in that the function of a band rejection filter (not shown) is provided inside the optical coupler and individual band rejection filters 771, 871 are therefore not needed. The other elements are identical to multiple band optical amplifier 10 of FIG. 2.

Furthermore, in the second embodiment, WDM coupler 743 for demultipexing only a part of the C-band wavelength is provided on the output of the C-band side of the band demultiplex coupler 1. In the same manner, WDM coupler 744 for multiplexing only a part of the C-band wavelength is also provided to the optical receiving element 791 for monitoring the emitted light in the C-band side of the band multiplex coupler 2. Use of WDM coupler 744 which can realize the monitoring by rejecting the wavelength different from the amplifying band of the optical amplifier provides the advantage that characteristic specification of band demultiplex coupler 1 can be alleviated and a band reject filter can also be removed individually.

Figure 5:
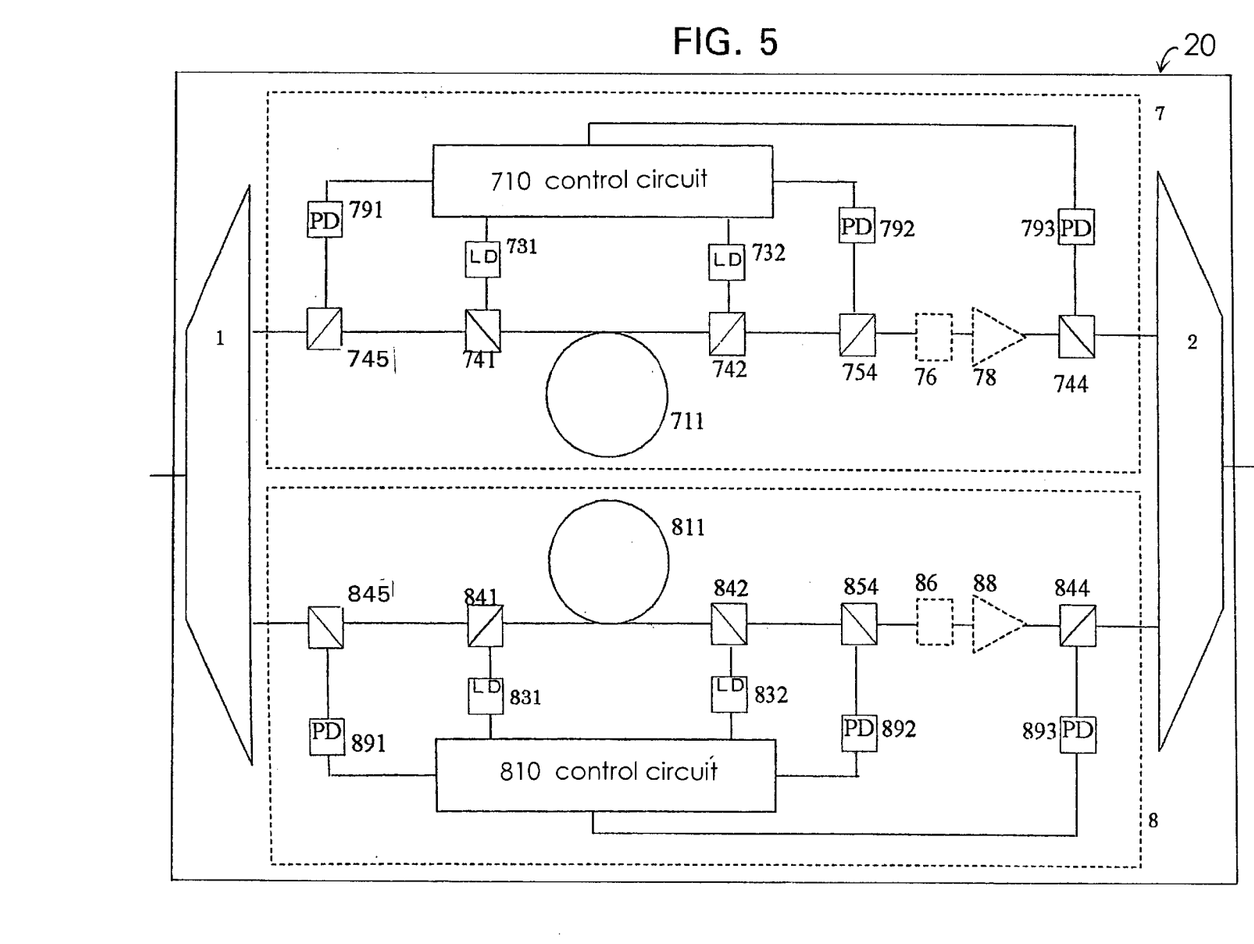
FIG. 5 is a block diagram of a multiple band optical amplifier according to a third embodiment of the present invention.
Figure 6:
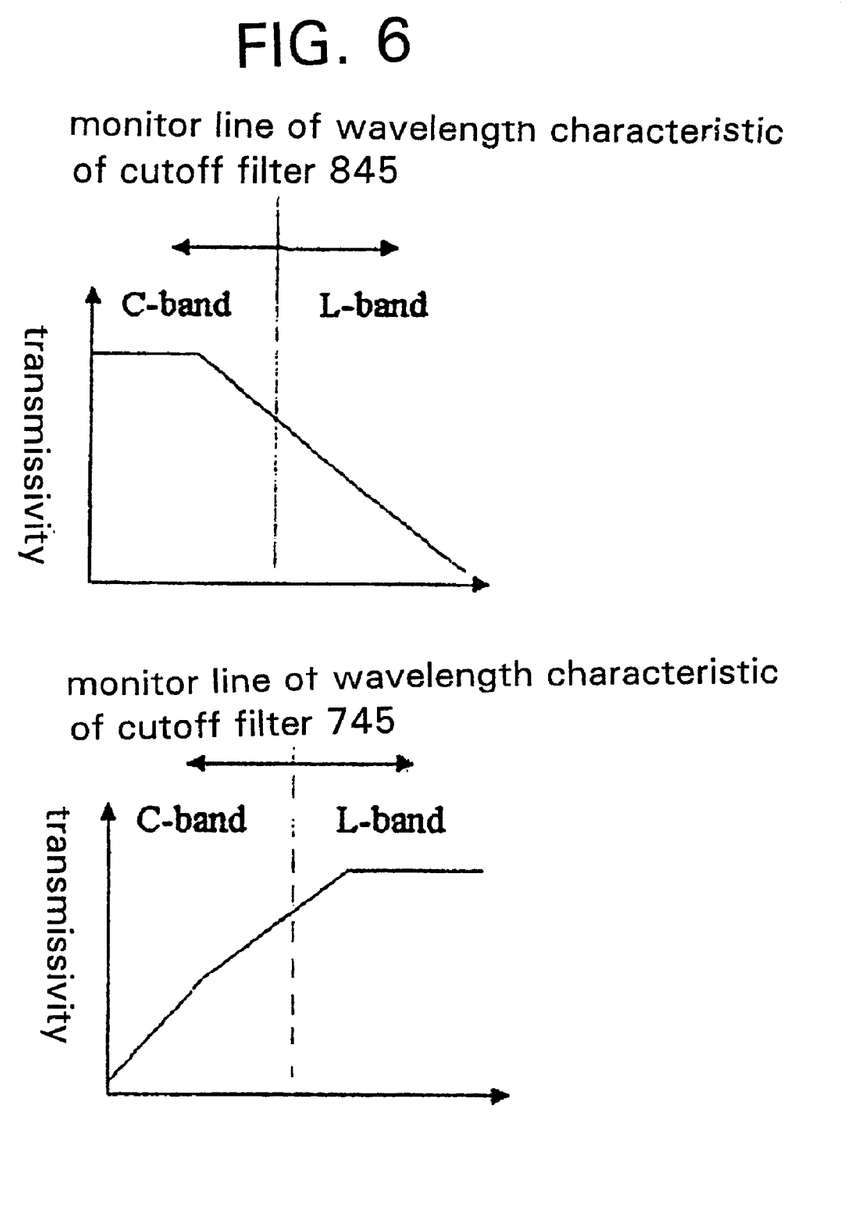
FIG. 6 is a wavelength characteristic of the third embodiment of the present invention.

FIG. 5 illustrates a third embodiment of the present invention. In this third embodiment, particular attention is paid to the performance of band rejection filters 745,845 which perform a function similar to that of rejection filters 771, 772, 871, 872 and WDM couplers 743, 843. Band rejection filters 745, 845 are designed to provide a smooth characteristic, as illustrated in FIG. 6.

The amount of rejecting the crosstalk light through the band rejection filters 745, 845 is not required to be rejected perfectly in relation to the predetermined band, and is effective only by rejecting the predetermined amount of the total power. Thus, even if a band rejection type filter 771, 772, 871, 872 as illustrated in FIG. 3 is not required, any filter, which is designed to show such a smooth characteristic as illustrated in FIG. 6, sufficiently functions if it can reject the predetermined amount of total power in the predetermined band.

Figure 7:
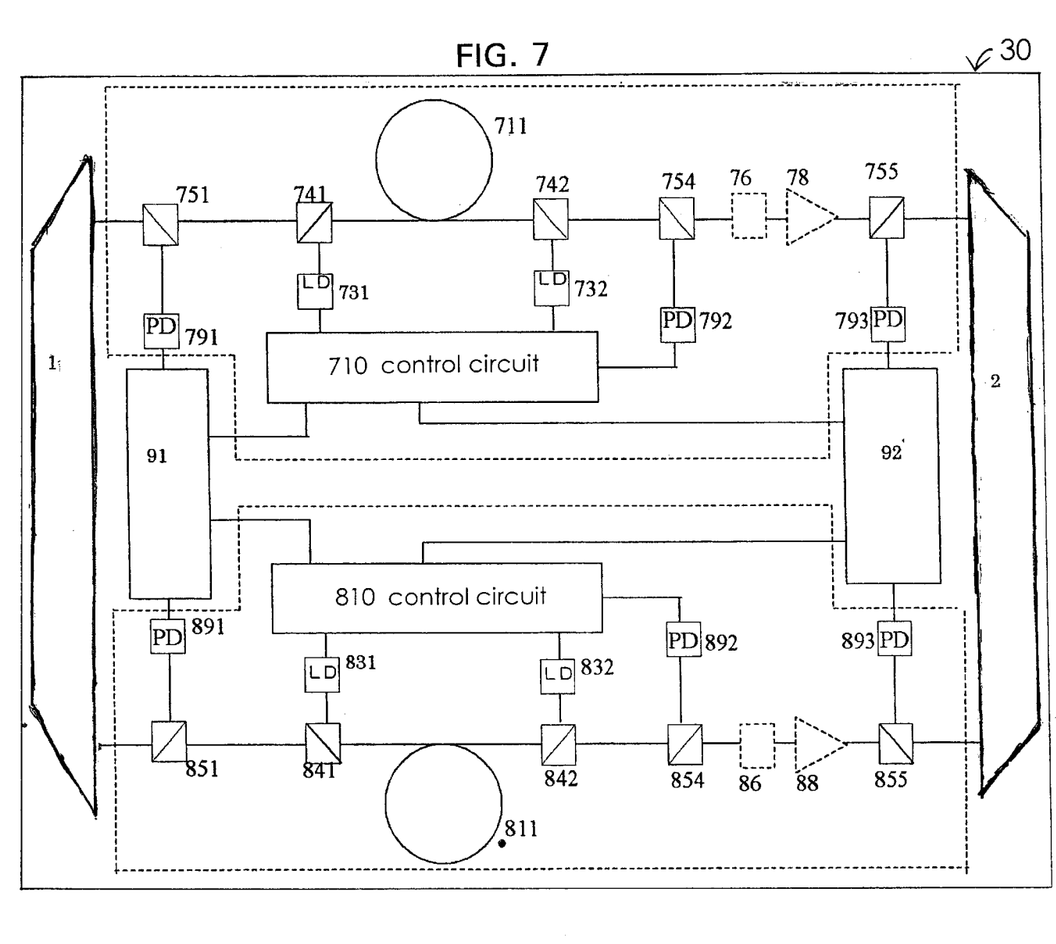
FIG. 7 is a block diagram of a multiple band optical amplifier according to a fourth embodiment of the present invention.

FIG. 7 illustrates a multiple band optical amplifier 30 according to a fourth embodiment of the present invention. The embodiment of FIG. 7 has a structure for electrically correcting a processor function that calculates, after detecting the receiving optical level in the optical receiving elements 791, 891, 793, 893, respectively, the incident crosstalk light level from the assumed crosstalk of the band demultiplex coupler 1 and band multiplex coupler 2 and the optical receiving level of the other band, and then uses the optical receiving level after subtraction of such incident crosstalk light level as the optical input level.

For instance, when the receiving optical level on the L-band side is $P_{inL}$, receiving optical level in the C-band side is $P_{inC}$, crosstalk of L-band to the C-band side in the demultiplex coupler 1 is $L_{Xt}$ (dB), crosstalk of C-band to the L-band side is $C_{Xt}$ (dB), true L-band value is $P_L$ (dBm), true C-band value is $P_C$ (dBm), demultiplex loss of L-band in the bandwidth demultiplex coupler is $L_L$ (dB), demultiplex loss of C-band in the bandwidth demultiplex coupler is $L_C$ (dB), isolation for the C-band is $I_{CL}$ (dB), isolation for the L-band is $I_{LC}$ (dB) the following equations (1), (2) are defined, which describes that $P_{inL}$ is the antilog sum of $(P_L-L_L)$ and $(P_C-I_{CL})$, and that $P_{inC}$ is the antilog sum of $(P_C-L_C)$ and $(P_L-I_{LC})$.

$$P_{inL}=P_L-L_L+C_{Xt}=P_L-L_L+(P_C-I_{CL}) \tag{1}$$

$$P_{inC}=P_C-L_C+L_{Xt}=P_C-L_C+(P_L-I_{LC}) \tag{12}$$

Here, $L_L$, $L_C$, $I_{CL}$, $I_{LC}$ are determined uniquely depending on the bandwidth of demultiplex coupler 1 and the bandwidth of multiplex coupler 2. Therefore, the true L-band value $P_L$ and true C-band value $P_C$ can be obtained by detecting $P_{inL}$ and $P_{inC}$ and then calculating these values by the equations (1) and (2).

In particular, processor circuit 91 satisfying the above equations is provided to conduct the calculation on the basis of the outputs of optical receiving elements 791, 891 and then the true L-band value $P_L$ and true C-band value $P_C$ which have been obtained by electrically correcting the error due to crosstalk of the band demultiplex coupler 1 are input to the control circuits 710 and 810. Thereby, control circuits 710, 810 can execute the predetermined control explained in regard to the first embodiment.

Moreover, the control circuits 710, 810 can also execute the predetermined controls by providing processor circuit 92 satisfying the above equations to calculate outputs of optical receiving elements 793, 893 and then respectively inputting the true C-band value and L-band value to the control circuits 710 and 810 obtained by electrically correcting the error due to crosstalk data of the band multiplex coupler 2.

The present invention can prevent control error due to the crosstalk between the bands occurring in the multiple bandwidth optical fiber amplifier without deterioration of characteristic of the main signal.

Although a few preferred embodiments of the present invention have been shown and described, it would be appreciated by those skilled in the art that changes might be made in these embodiments without departing from the principles and spirit of the invention, the scope of which is defined in the claims and their equivalents.

What is claimed is:

1. An apparatus comprising:
   a demultiplexer isolating an optical wavelength multiplex signal light into a light of a first wavelength band and a light of a second wavelength band;
   a first optical amplifier amplifying the light of the first wavelength band;
   a second optical amplifier amplifying the light of the second wavelength band;
   a first monitor monitoring an input light of said first optical amplifier; and
   a first optical device filtering an input light of said first monitor,
   wherein the input light of said first monitor is filtered by a first filter rejecting the light of the second wavelength band.

2. An apparatus comprising:
   a demultiplexer isolating an optical wavelength multiplex signal light into a light of a first wavelength band and a light of a second wavelength band;
   a first optical amplifier amplifying the light of the first wavelength band;
   a second optical amplifier amplifying the light of the second wavelength band;
   a first monitor monitoring an input light of said first optical amplifier; and
   a first optical device filtering an input light of said first monitor,
   wherein the light of the second wavelength band is filtered by a second filter rejecting the light of the first wavelength band.

3. An apparatus as claimed in claim 1, wherein said first monitor is an optical receiving element.

4. An apparatus as claimed in claim 1, wherein said first optical device is an optical filter.

5. An apparatus as claimed in claim 1, wherein said first optical device is an optical separator separating the light of the first wavelength band.

6. An apparatus as claimed in claim 1, further comprising a multiplexer multiplexing an output light of said first optical amplifier and an output light of the second optical amplifier.

7. An apparatus comprising:
   a demultiplexer isolating an optical wavelength multiplex signal light into a light of a first wavelength band and a light of a second wavelength band;
   a first optical amplifier amplifying the light of the first wavelength band;
   a second optical amplifier amplifying the light of the second wavelength band;
   a first monitor monitoring an input light of said first optical amplifier;
   a first optical device filtering an input light of said first monitor; and
   a second monitor monitoring a light returning from said multiplexer and located between said first optical amplifier and said multiplexer.

8. An apparatus as claimed in claim 7, further comprising a second optical device filtering an input light of said second monitor.

9. An apparatus as claimed in claim 1, further comprising a third monitor monitoring an input light of said second optical amplifier.

10. An apparatus as claimed in claim 9, further comprising a third optical device filtering an input light of said third monitor.

11. An apparatus comprising:
    a demultiplexer isolating an optical wavelength multiplex signal light into a light of a first wavelength band and a light of a second wavelength band;
    a first optical amplifier amplifying the light of the first wavelength band;
    a second optical amplifier amplifying the light of the second wavelength band;
    a first monitor monitoring an input light of said first optical amplifier;
    a first optical device filtering an input light of said first monitor; and
    a fourth monitor monitoring a light returning from said multiplexer located between said second optical amplifier and said multiplexer.

12. An apparatus as claimed in claim 11, further comprising the fourth optical device filtering an input light of said fourth monitor.

13. An apparatus comprising:
    a demultiplexer isolating an optical wavelength multiplex signal light into a light of a first wavelength band and a light of a second wavelength band;
    a first optical amplifier amplifying the light of the first wavelength band;
    a second optical amplifier amplifying the light of the second wavelength band;
    a first monitor monitoring an input light of said first optical amplifier;
    a second monitor monitoring an input light of said second optical amplifier; and
    a first detector detecting an amount of crosstalk of said demultiplexer by detecting an output of said first monitor and said second monitor.

14. An apparatus as claimed in claim 13, further comprising a multiplexer multiplexing an output light of said first optical amplifier and an output light of said second optical amplifier.

15. An apparatus as claimed in claim 14, further comprising;
    a third monitor monitoring a light returning from said multiplexer and located between said first optical amplifier and said multiplexer; and
    a fourth monitor monitoring a light returning from said multiplexer and located between said second optical amplifier and said multiplexer.

16. An apparatus as claimed in claim 15, further comprising a second detector detecting an amount of crosstalk of said multiplexer by detecting an output of said third monitor and fourth monitor.

17. An apparatus comprising:
    a first optical amplifier amplifying an light of a first wavelength band;
    a second optical amplifier amplifying an light of a second wavelength band;
    a multiplex coupler multiplexing output wavelengths of said first and second optical amplifiers;
    first monitor means detecting a light returning from said multiplex coupler and located between said first optical amplifier and said multiplexer; and
    means for rejecting the light of the second wavelength band from the multiplexer.

18. A multiple band optical amplifier comprising:
a first optical amplifier amplifying an light of a first wavelength band;
a second optical amplifier amplifying an light of a second wavelength band;
a multiplex coupler multiplexing output wavelengths of said first and second optical amplifiers;
a first and a second monitor means detecting an light returning from said multiplex coupler; and
means for detecting crosstalk of said multiplex coupler based on a value detected by said first and second monitor means.

19. A multiple band optical amplifier to multiplex a plurality of amplified optical signals of a plurality of wavelength bands, said plurality of amplified optical signals divided from a first optical signal transmitted on a transmission line comprising:
a monitor part provided for each of the plurality of wavelength bands when the first optical signal is divided into the plurality of wavelength bands; and
means provided in a preceding stage of said monitor part for rejecting a wavelength band other than that amplified with said optical amplifier.

20. A multiple band optical amplifier comprising:
a first optical amplifier to receive optical energy of a first wavelength band, said first optical amplifier comprising a first monitoring means to detect a power of optical energy of the first wavelength band;
a second optical amplifier to receive optical energy of a second wavelength band, said second optical amplifier comprising a second monitoring means to detect a power of the optical energy of the second wavelength band;
a first control circuit to receive an output of said first monitoring means;
a second control circuit to receive an output of said second monitoring means;
a first rejection filter to filter said first wavelength band from the output of said first monitoring means; and
a second rejection filter to filter the second wavelength band from the output of said second monitoring means,
said first and second monitoring means comprising diodes.

21. A multiple band optical amplifier as claimed in claim 20, further comprising:
a first control circuit to receive the filtered first wavelength band from said first rejection filter; and
a second control circuit to receive the filtered second wavelength band from said second rejection filter.

22. A multiple band optical amplifier as claimed in claim 21, further comprising a multiplexer to multiplex an output light of said first optical amplifier and said second optical amplifier.

23. A multiple band optical amplifier as claimed in claim 22, further comprising a detector to detect an amount of crosstalk of said demultiplexer by detecting the power detected by said first and said second monitoring means.

* * * * *